(12) United States Patent
Shibuya

(10) Patent No.: US 11,050,309 B2
(45) Date of Patent: Jun. 29, 2021

(54) MOTOR STATOR, METHOD OF MANUFACTURING MOTOR STATOR, AND MOTOR

(71) Applicant: NISSO ELECTRIC CORPORATION, Atsugi (JP)

(72) Inventor: Hiroshi Shibuya, Atsugi (JP)

(73) Assignee: NISSO ELECTRIC CORPORATION, Atsugi (JP)

( * ) Notice: Subject to any disclaimer, the term of this patent is extended or adjusted under 35 U.S.C. 154(b) by 172 days.

(21) Appl. No.: 16/095,095

(22) PCT Filed: Jun. 9, 2017

(86) PCT No.: PCT/JP2017/021490
§ 371 (c)(1),
(2) Date: Oct. 19, 2018

(87) PCT Pub. No.: WO2018/008328
PCT Pub. Date: Jan. 11, 2018

(65) Prior Publication Data
US 2019/0068010 A1    Feb. 28, 2019

(30) Foreign Application Priority Data
Jul. 8, 2016    (JP) .............................. JP2016-135616

(51) Int. Cl.
*H02K 1/18*    (2006.01)
*H02K 1/14*    (2006.01)
*H02K 15/03*    (2006.01)

(52) U.S. Cl.
CPC ............. *H02K 1/187* (2013.01); *H02K 1/148* (2013.01); *H02K 15/03* (2013.01)

(58) Field of Classification Search
CPC ......... H02K 1/187; H02K 1/148; H02K 15/03
(Continued)

(56) References Cited

U.S. PATENT DOCUMENTS

| 6,741,005 | B2* | 5/2004 | Vohlgemuth ............. H02K 1/16 29/596 |
| 6,747,379 | B2* | 6/2004 | LaBrush .................. H02K 1/04 310/254.1 |

(Continued)

FOREIGN PATENT DOCUMENTS

| CN | 102832761 A | 12/2012 |
| JP | H08-098440 A | 4/1996 |

(Continued)

OTHER PUBLICATIONS

Office Action of corresponding Japanese Patent Application No. 2018-525986: Decision on Refusal dated Dec. 4, 2019 (5 sheets).

(Continued)

*Primary Examiner* — Forrest M Phillips
(74) *Attorney, Agent, or Firm* — Kratz, Quintos & Hanson, LLP

(57) ABSTRACT

A stator and a method of manufacturing the same for facilitating a winding step of armature windings and reducing cogging torque.

A segment part 121 radially having a plurality of teeth 121A and joined arcuately at one end is punched out from an oriented electromagnetic steel sheet 200, such segment parts 121 are circularly connected, the circularly connected segment parts 121 are stacked thereby forming a tooth part 120, armature winding 130 is wound from the other end of the tooth 121A, and the tooth part 120 is fitted into a circular yoke part 110 having a plurality of recesses 111 at the inner circumference and stacked in the axial direction of the motor.

8 Claims, 8 Drawing Sheets

(58) Field of Classification Search
USPC .................................................... 310/254.1
See application file for complete search history.

(56) References Cited

U.S. PATENT DOCUMENTS

| | | | | |
|---|---|---|---|---|
| 6,787,965 | B1* | 9/2004 | Horng | H02K 1/145 |
| | | | | 310/156.32 |
| 8,106,561 | B2* | 1/2012 | Myojin | H02K 1/148 |
| | | | | 310/216.043 |
| 10,177,631 | B1* | 1/2019 | Hopkins | H02K 3/44 |
| 2013/0293060 | A1* | 11/2013 | Hasuo | B21D 28/06 |
| | | | | 310/254.1 |
| 2018/0026501 | A1* | 1/2018 | Ogikubo | B21D 28/10 |
| | | | | 29/596 |
| 2018/0205301 | A1* | 7/2018 | Didier | H02K 16/04 |
| 2019/0190325 | A1* | 6/2019 | Nakahara | H02K 1/148 |

FOREIGN PATENT DOCUMENTS

| | | | |
|---|---|---|---|
| JP | 2000-245083 | A | 9/2000 |
| JP | 2005-143164 | A | 6/2005 |
| JP | 2006-050680 | A | 2/2006 |
| JP | 2009-050138 | A | 3/2009 |
| JP | 2010-259270 | A | 11/2010 |
| JP | 2011-125176 | A | 6/2011 |
| JP | 2013-510270 | A | 3/2013 |
| WO | WO-2015159389 | A1* | 10/2015 ........... H02K 15/022 |

OTHER PUBLICATIONS

International Search Report for International Application No. PCT/JP2017/021490 dated Aug. 15, 2017 (2 Sheets).

Office Action of Chinese Patent Application No. 201780039458.X dated Apr. 22, 2020 (7 sheets, 7 sheets translation, 14 sheets total).

* cited by examiner

MOTOR STATOR, METHOD OF MANUFACTURING MOTOR STATOR, AND MOTOR

TECHNICAL FIELD

The present invention relates to a motor stator, a method of manufacturing the motor stator, and the motor.

BACKGROUND ART

A servo motor known so far has a mechanism of controlling amounts of positions, directions and attitudes of objects and operating automatically such that they follow reference values. The servo motor is used for controlling position, velocity, etc. (for example, refer to the Patent Literature 1).

Among them, in a press machine for pressing sheet material by using a complicate mold, movement of a pressing part is controlled by a servo motor for enabling complicate pressing process.

For a servo motor requiring a large force as for the pressing machine, a large-scale motor is used and a large torque is necessary.

FIG. 7 is a cross sectional view showing the structure of an existent motor.

As shown in FIG. 7, an armature winding 13 is inserted into a slot 12 formed between each of a plurality of teeth 11 protruding from a yoke 10 (for the convenience of explanation, armature windings 13 are illustrated only for those in five slots 12 in the upper portion of FIG. 7).

CITATION LIST

Patent Literature

PTL 1: Japanese Unexamined Patent Application Publication (JP-A) No. 2009-50138

SUMMARY OF INVENTION

Technical Problem

However, a multi-slot motor having an increased number of slots for obtaining a large torque involves a problem of requiring much time for the operation of inserting armature windings into the slots.

FIG. 8 is a detailed view showing armature windings inserted in the slots.

For example, as shown in FIG. 8, in the work of inserting an armature winding 13 into a slot 12, the armature winding 13 is inserted from an opening 14 formed at the top end of the slot. The opening 14 is made narrow and the work of inserting the armature winding 13 is extremely difficult. Further, for increasing the number of turns, a work of winding the armature winding 13 with no gap is necessary and a manual operation sometimes takes as much as several hours for one slot.

In a case of a multi-slot motor, a work load further increases because of large number of slots and it took as much as several days to complete a motor.

The opening 14 is necessary as an inlet upon insertion of the armature winding 13 into the slot 12, but the distance between adjacent teeth 11 is enlarged when the opening 14 is made larger. This concentrates magnetic action generated upon flowing of current in the motor to the magnetic permeable tooth 11, whereas the magnetic fields are extremely weakened in the armature windings 13 and the opening 14. Accordingly, since difference is caused in the magnetic attraction force upon movement of the rotor 15, a phenomenon called as cogging torque is generated. If the cogging torque is generated, this causes a problem of noises or vibrations.

The opening 14 as a gap between the teeth 11 gives an intense effect on the cogging torque and, while the cogging torque is decreased as the opening 14 is narrowed, since the winding work is impossible if the opening is excessively narrow, this does not provide a solution for decreasing the cogging torque.

The present invention has been made in view of such problems and it is an object thereof to provide a motor stator, a method of manufacturing the motor stator and the motor capable of facilitating the winding process of the armature winding 13 and decreasing the cogging torque.

Solution to Problem

For solving the problems described above, the present invention provides a motor stator including a circular yoke part having a plurality of recesses at an inner circumference and stacked in an axial direction of the motor, a tooth part in which segment parts radially having a plurality of teeth contained at one end in the plurality of recesses and connected arcuately at the other end are joined circularly and stacked in the axial direction, and armature windings wound from one end of the teeth.

Thus, the circular yoke part stacked in the axial direction of the motor has a plurality of recesses at the inner circumference, the tooth part has the segment part radially having a plurality of teeth each contained at one end in the plurality of recesses and joined circularly and stacked in the axial direction, and the armature windings are wound from one end of each of the teeth.

Further, the present invention provides a method of manufacturing a motor stator including a step of punching a segment part radially having a plurality of teeth and arcuately connected at one end from an oriented electromagnetic steel sheet, a step of circularly joining the segment parts, a step of stacking the circularly joined segment parts thereby forming a tooth part, a step of winding armature windings from the other end of the teeth, and a step of fitting the tooth part into a circular yoke part having a plurality of recesses at an inner circumference and stacked in an axial direction.

Thus, the segment part radially having a plurality of teeth and arcuately connected at one end is punched from the oriented electromagnetic steel sheet, circularly joining the segment parts, stacking the circularly joined segment parts to form a tooth part, windings the armature windings to the tooth from the other end, and fitting the tooth part into the circular yoke part having a plurality of recesses at the inner circumference and stacked in the axial direction.

Further, the present invention provides a motor having a rotor and a stator in which teeth are wound with armature windings, including a circular yoke part having a plurality of recesses at an inner circumference and stacked in an axial direction of the motor, a tooth part in which segment parts radially have a plurality of teeth contained at one end in the plurality of recesses and connected arcuately at the other end are connected circularly and stacked in the axial direction, and armature windings wound from one end of the teeth.

Thus, since the circular yoke part stacked in the axial direction of the motor has a plurality of recesses at the inner circumference and, in the tooth part, segment parts radially having a plurality of teeth with one end being contained in the plurality of the recesses and the other end being connected arcuately are connected circularly and stacked in the axial direction, and the armature winding is wound at one end of the tooth.

Advantageous Effects of Invention

According to the motor stator of the present invention, since the circular yoke part stacked in the axial direction of the motor has a plurality of recesses at the inner circumference, the tooth part has segment parts radially having a plurality of teeth contained at one end in the plurality of recesses and is joined arcuately at the other end and stacked in the axial direction, and the armature windings are wound around the teeth from one end of the teeth, the winding step of the armature windings can be simplified and the togging torque can be decreased.

DESCRIPTION OF EMBODIMENTS

Preferred embodiments of the present invention are to be described in details with reference to the drawings.

Figure 1:
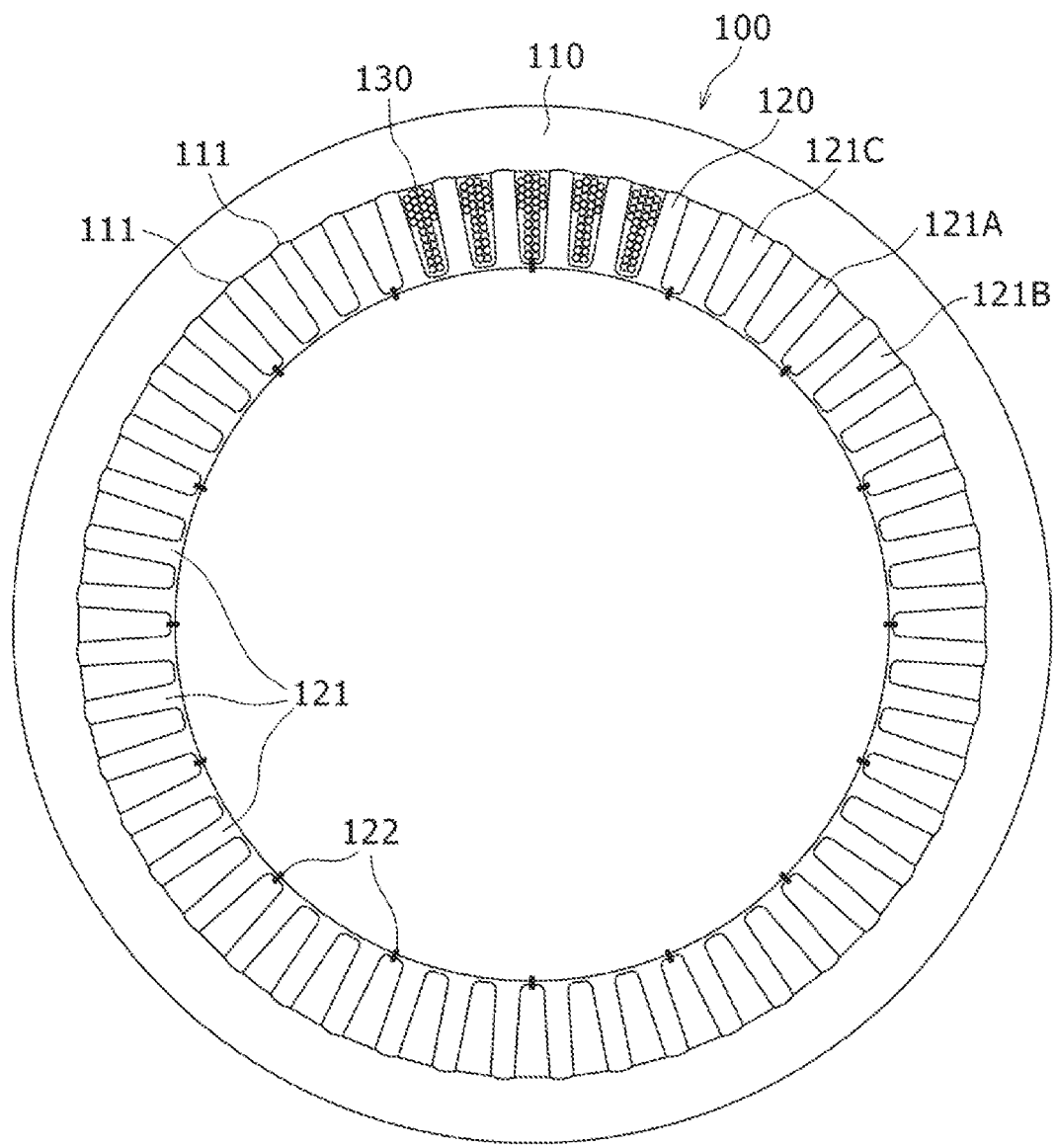
[FIG. 1] is a cross sectional view showing the configuration of a stator according to the present embodiment.

FIG. 1 is a cross sectional view showing the configuration of a stator according to the present embodiment.

As shown in FIG. 1, a stator 100 includes a yoke part 110, a tooth part 120, and armature windings 130. This embodiment is an example comprising tooth 121A by the number of 48.

The yoke part 110 is formed by punching a non-oriented electromagnetic steel sheet by a mold press so as to form an annular outer circumference and stacking same in the axial direction of the motor by using an adhesive, etc., in which the yoke part 110 has a plurality of recesses 111 (by the number of 48 in this embodiment) at the inner circumference of the yoke part 110.

The tooth part 120 comprises a plurality of segments 121 (by the number of 16 in this embodiment) joined circularly. The segment 121 is formed by punching from an oriented electromagnetic steel sheet by using a mold press, and radially has a plurality of teeth 121A (by the number of 3 in this embodiment). One end of the tooth 121A is formed in symmetrical with the longitudinal direction of the recess 111 and the tooth 121A provided to the yoke part 110 and a portion at one end of the tooth 121A is in such a shape as contained in the recess 111. The other end of each of the teeth 121A is connected in a half arcuate shape to form "E"-shaped configuration.

The segments 121 are joined circularly by way of a seam 122 to form a circular inner circumferential surface. Further, the segments 121 joined circularly are stacked in the axial direction of the motor by using an adhesive or the like.

In the tooth part 120, each of a plurality of slots 121B is formed between each of the teeth 121A and armature winding 130 are wound in the slot 121B continuously in the axial direction of the motor.

Figure 8:
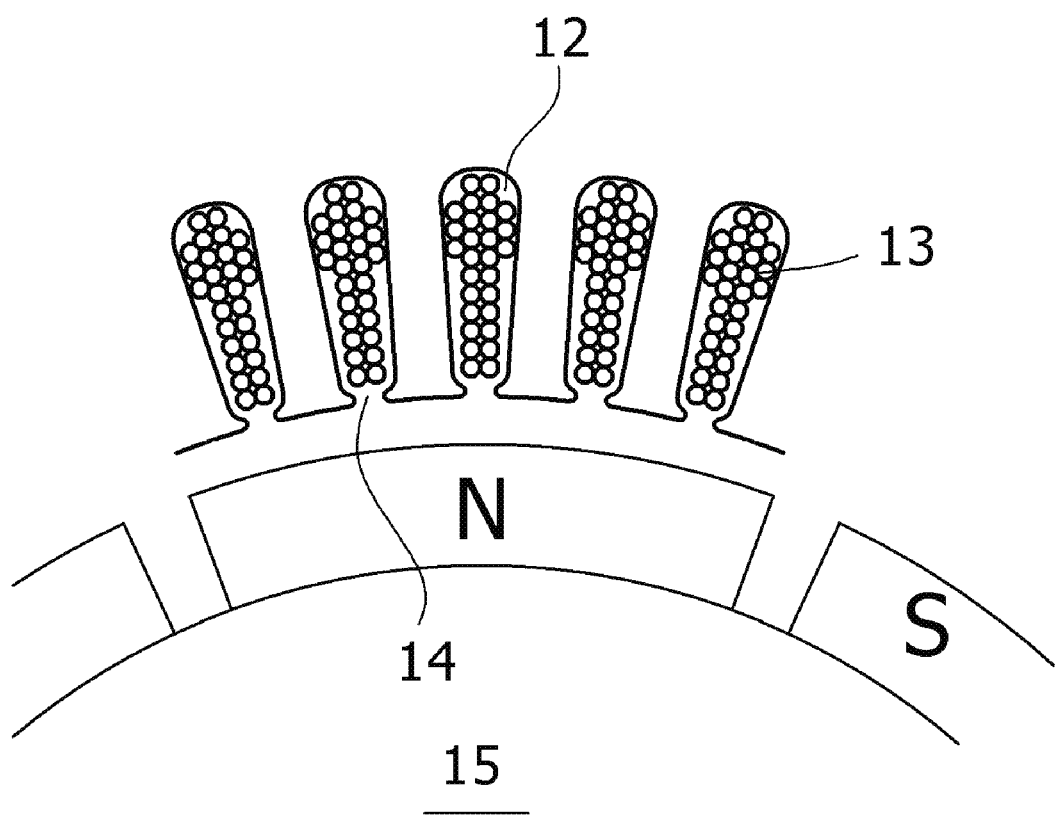
[FIG. 8] is a detailed view showing armature windings inserted in slots.

In the existent armature winding work, armature windings 13 had to be inserted through a narrow opening 14 as shown in FIG. 8. Further, since the torque generated in the motor is in proportion with the number of turns of the armature windings 13, the armature winding 13 had to be wound with no gap to the formed slot 12 in order to improve the torque.

In this embodiment, each of the teeth 121A is arranged radially and the opening 121C of the slot 121B is formed spaciously. Thus, the winding work can be performed easily.

After completion of the winding work, teeth 121A are inserted in the axial direction of the motor according to the recess 111 formed in the yoke part 110 to assemble the stator 100.

Figure 2:
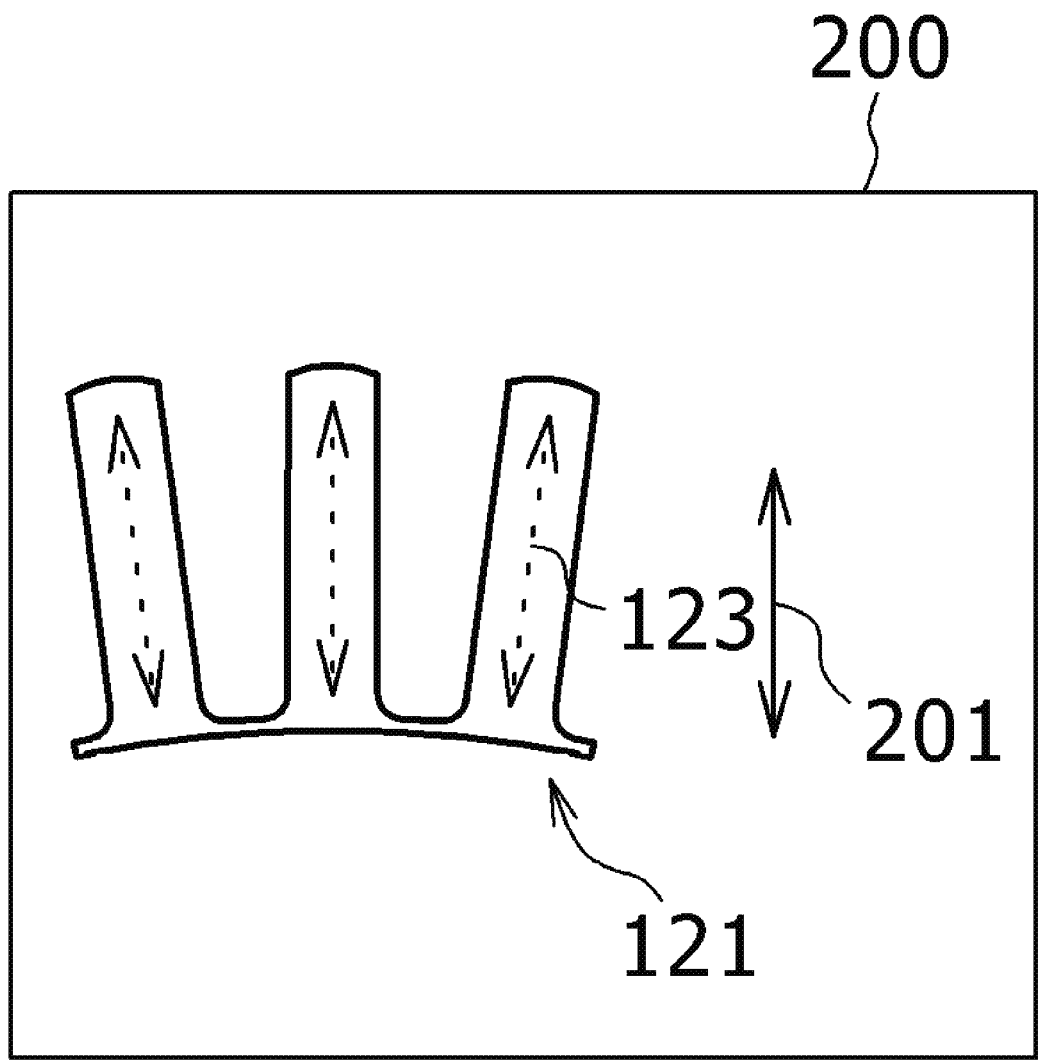
[FIG. 2] is a front elevational view showing details of a segment that configures a tooth part.

FIG. 2 is a front elevational view showing details of a segment that configures the tooth part.

As shown in FIG. 2, the segment 121 is formed by punching from an oriented electromagnetic steel sheet 200 by a mold press and radially has a plurality of teeth 121A (by the number of three in this embodiment).

The oriented electromagnetic steel sheet is a steel sheet having an excellent magnetic property in the rolling direction in which magnetic flux tends to flow easily in the direction of an arrow 201.

When a current flows in the motor, a magnetic field 123 is generated along the longitudinal direction of the radially provided tooth 121A. Since the tooth 121A is directed to the rolling direction of the electromagnetic steel sheet along the longitudinal direction of the tooth 121A, the magnetic field tends to flow easily and a large magnetic field can be taken. Further, loss of the magnetic field generated in the tooth part 120 can be decreased.

Further, when compared with the step of punching out the tooth 121A in a divided shape one by one along the rolling direction of the oriented electromagnetic steel sheet and radially assembling the punched tooth 121A one by one, since segments 121 formed by joining three teeth 121A in advance are only have to be assembled into a circular shape in this embodiment, the working step of circularly arranging the tooth part 120 can be shortened remarkably.

Further, since this embodiment comprises teeth 121A by the number of 48 in total, an angle of each tooth 121A is 7.5 degree. Ysince the angular difference between the rolling direction of the oriented electromagnetic steel sheet 200 and the tooth 121A is 7.5 degree, which is insignificant in the passing direction of the magnetic field in view of the characteristics, the tooth part 120 can be formed while decreasing the loss of the magnetic field generated in the tooth part 120.

Further, if the number of slots is increased in order to improve the torque, the angle of the tooth 121A becomes small to approach the rolling direction. Accordingly, a motor increased in the number of slots for improving the torque can further take an advantageous effect of the oriented electromagnetic steel sheet.

While the number of the segments 121 can be decreased by increasing the number of the teeth 121A that form the segments 121, if the number of the teeth 121A is increased, angular difference relative to the tooth 121A is increased more toward both ends of the segment 121 compared with the rolling direction of the oriented electromagnetic steel sheet. Accordingly, the amount of the teeth 121A provided in the segment 121 is desirably 2 to 3.

Figure 3:
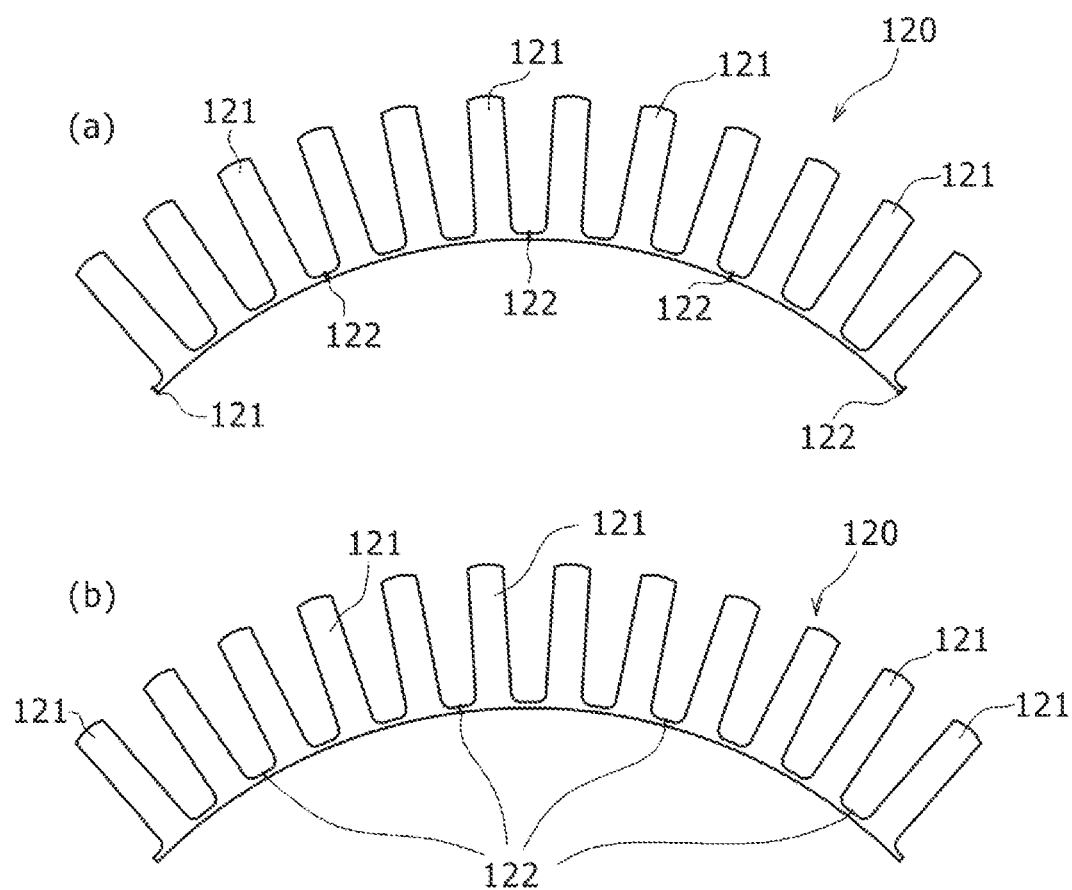
[FIG. 3] is a front elevational view showing a state of joining segment parts and stacking tooth parts.

FIG. 3 is a front elevational view showing the state of connecting the segment parts and stacking the tooth parts.

FIG. 3(a) shows the state of joining the segments 121 by way of seams 122. The seams 122 are evenly distributed to the inner circumference of the tooth part 120, and they are arranged such that one of the seams 122 is at the uppermost end of the inner circumferential circle.

FIG. 3(b) shows a state of circularly joining the segments 121 by way of the seams 122. The seams 122 are evenly distributed to the inner circumference of the tooth part 120, and arranged while being displaced by 7.5 degrees to the left, or 15 degree to the right from the state shown in FIG. 3(a).

In the tooth part 120, segments 121 are stacked in the axial direction of the motor by using an adhesive or the like. It is preferred to stack them such that the FIG. 3(b) overlaps FIG. 3(a) upon stacking so as to avoid overlap of the seams 122. By stacking them with bonding while displacing the seams 122, the joined portions are dispersed to provide a firm structure.

As has been described above, it is desirable to stack such that the seams 122 do not overlap on every repeating of stacking and disposing and stacking them such that the positions of the seams 122 are not localized entirely.

Figure 4:
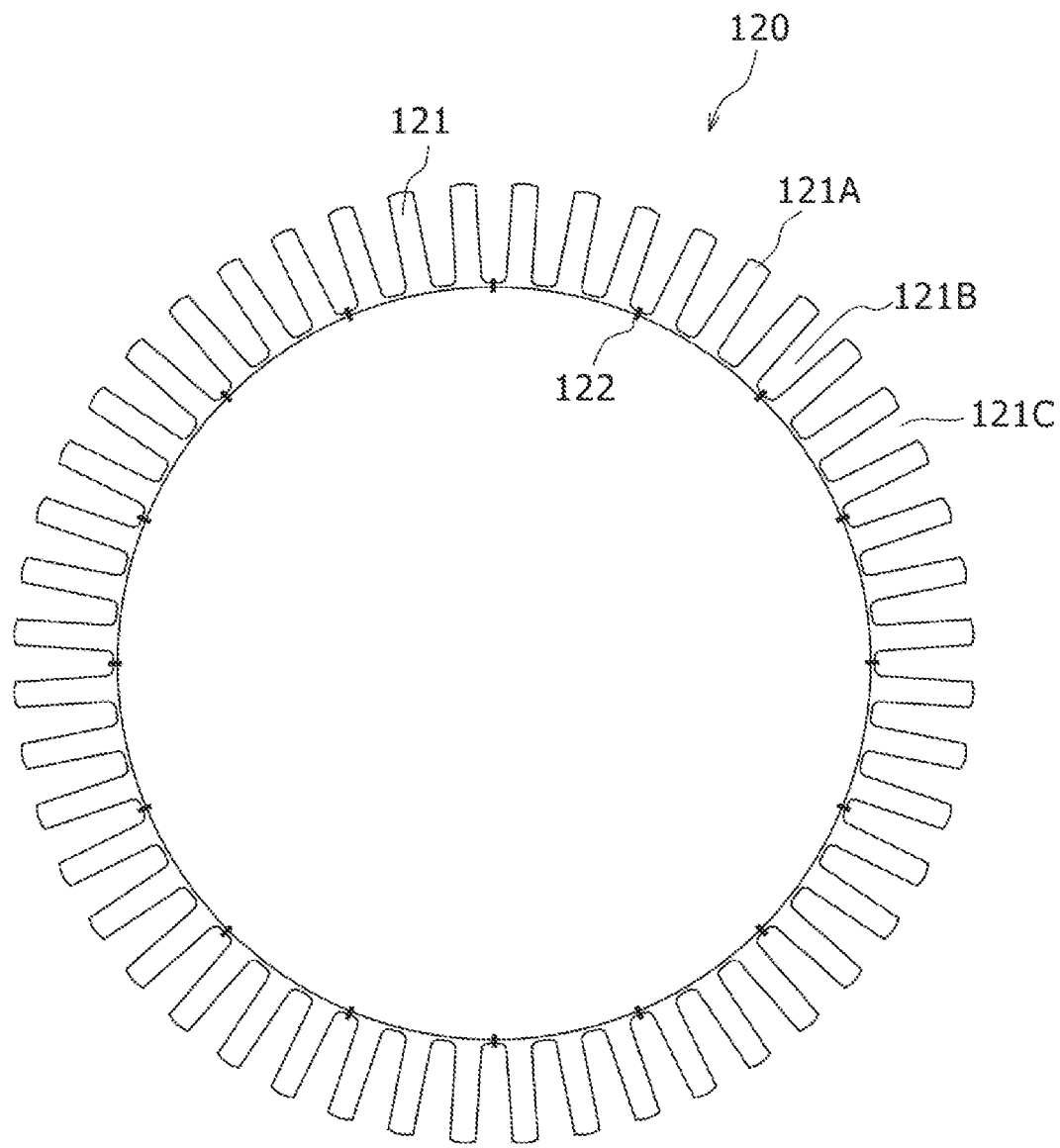
[FIG. 4] is a cross sectional view showing a stacked tooth part.

FIG. 4 is a cross sectional view showing stacked tooth parts.

As shown in FIG. 4, the tooth parts 120 stacked in the axial direction of the motor comprise a plurality of segments 121, and has radially comprising tooth 121A.

When the stacking of the tooth parts 120 is completed, armature windings 130 are wound in the slot 121B formed between each of the tooth 121A. In the slots 121B, since the opening 121C is opened to the direction of the outer circumferential surface, work of winding the armature windings 130 is facilitated.

Further, since the torque generated in the motor is in proportion to the number of turns of the armature windings 13, it is desired that the armature windings 130 are wound with no gaps in the slot 121B, Since the opening 121C is spacious, the armature winding 130 can be wound with no gaps in the slot 121B easily even by manual work. Thus, the torque generated in the motor can be improved.

Further, the tooth 121A provided to each of the segments 121 is formed of the oriented electromagnetic steel sheet as has been described above and directed so that the rolling direction of the oriented electromagnetic steel sheet is along with a longitudinal direction of the tooth 121A. Since the segment 121 is arranged circularly by way of the seams 122, the rolling direction of the oriented electromagnetic steel sheet is directed to the longitudinal direction, that is, to the radial direction of each tooth 121A. Thus, when a current flows in the motor, since a magnetic field is generated along the radially provided tooth 121A, magnetic field loss can be decreased.

Figure 5:
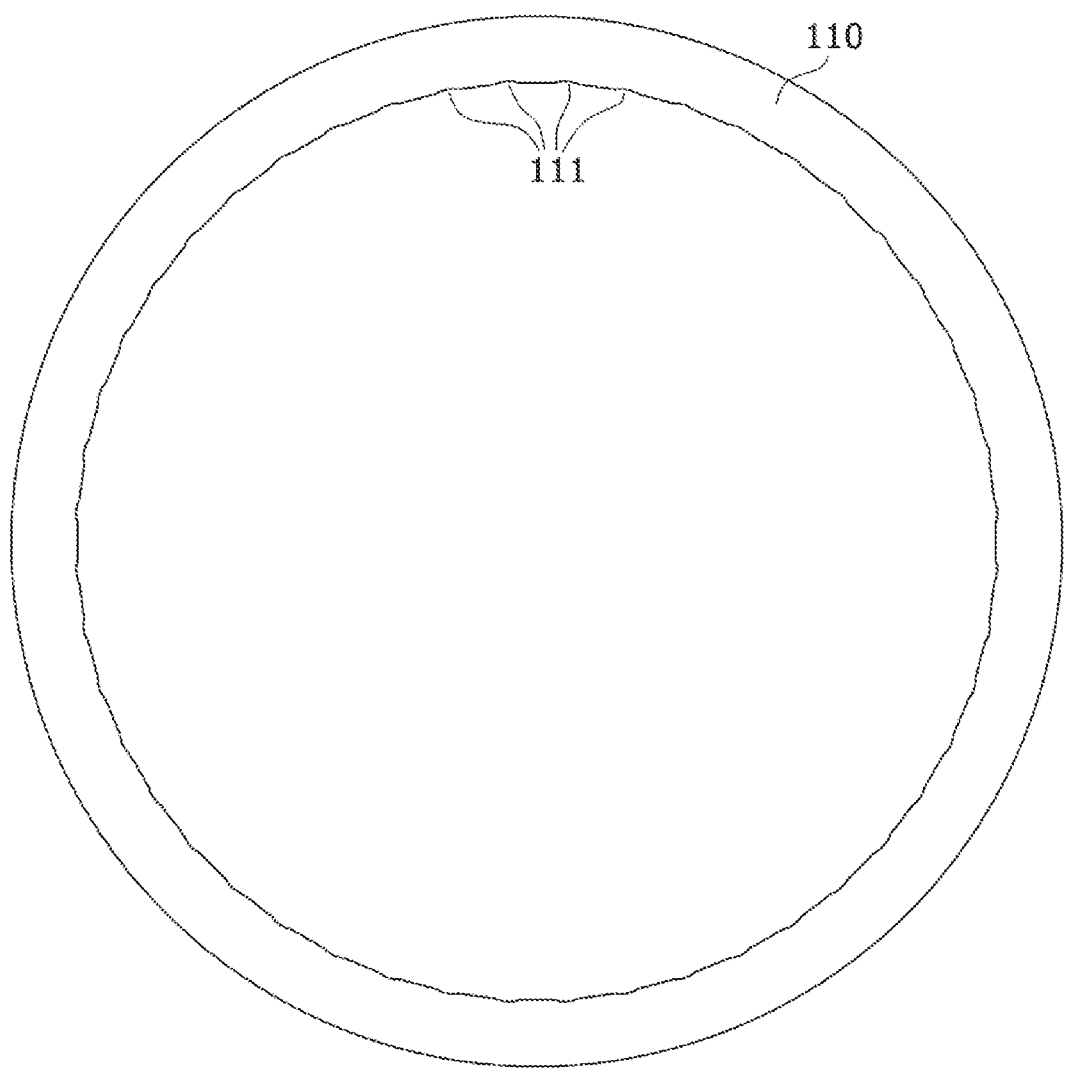
[FIG. 5] is a cross sectional view showing a yoke part.

FIG. 5 is a cross sectional view showing a yoke part.

As shown in FIG. 5, a plurality of recesses 111 (by the number of 48 in this embodiment) are provided at the inner circumference of the yoke part 110.

One end of the tooth 121A is formed in symmetrical with respect to the longitudinal direction of the recess 111 and the tooth 121A provided to the yoke part 110, and a portion at one end of the tooth 121A is shaped so as to be accommodated in the recess 111. The tooth part 120 for which winding of the armature winding 130 has been completed is inserted to the yoke part 110 such that the top end of the tooth 121A is aligned with the recess 111 provided to the yoke part 110. Thus, the tooth part 120 is fixed firmly to the yoke part 110.

The yoke part 110 is a path of a magnetic flux generated in the tooth part 120 upon flowing of a current to the motor and the direction of the magnetic flux is not constant. Then, the yoke part 110 is prepared by using a non-oriented electromagnetic steel sheet, circularly punching the sheet so as to form a circular outer circumference of the sheet by a mold press and stacking the sheets in the axial direction of the motor by using an adhesive or the like.

Figure 6:
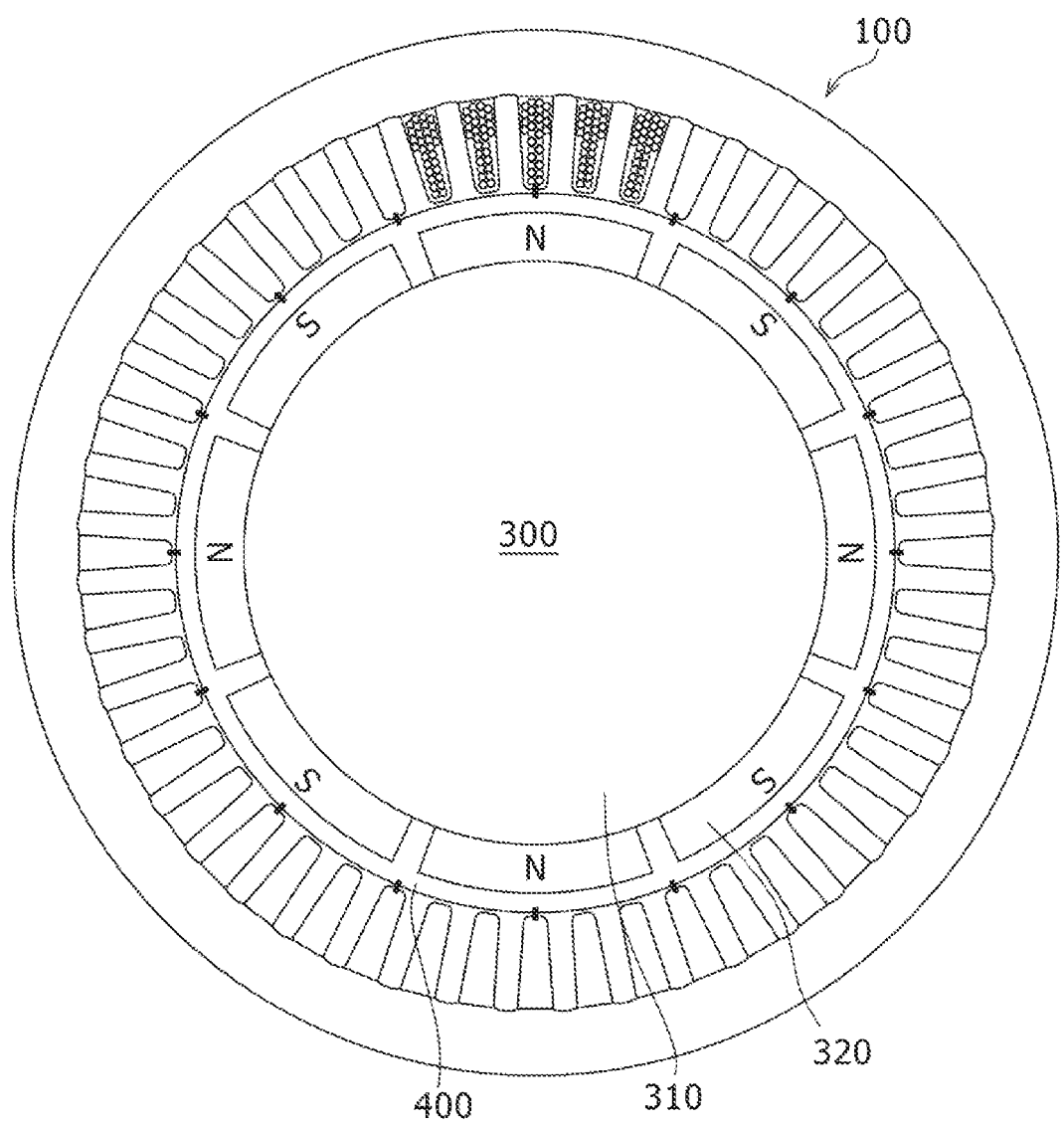
[FIG. 6] is a cross sectional view showing a stator and a rotor.
Figure 7:
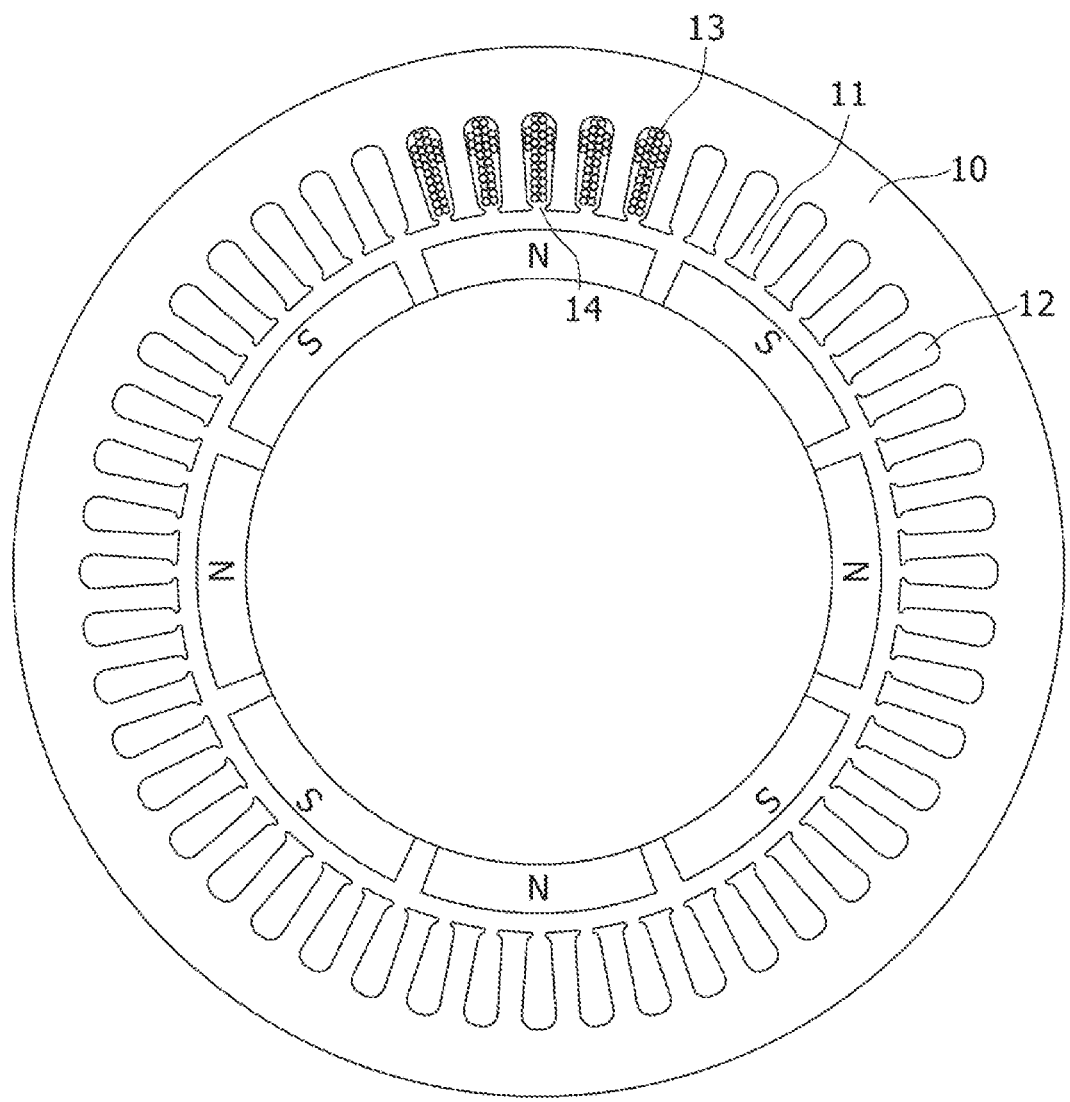
[FIG. 7] is a cross sectional view showing the structure of an existent motor.

FIG. 6 is a cross sectional view showing a stator and a rotor.

As shown in FIG. 6, a rotor 300 is provided to the inner circumferential side of the stator 100.

In the rotor 300, a plurality of permanent magnets 320 (by the number of 8 in this embodiment) are fixed relative to the stator core 310 each at a predetermined distance along the axial direction of the motor.

The thus configured rotor 300 is opposed by way of an air gap 400 to the inner circumferential surface of the stator 100.

When a current flows to the armature windings 130, since the inner circumference of the stator 100 is closed, the magnetic field generated in the stator 100 does not concentrate to the tooth 121A but is dispersed to the inner circumferential surface of the stator 100. Thus, the difference of the magnetic attraction force caused upon movement of the rotor 300 is decreased thereby enabling to decrease the togging torque.

REFERENCE SIGNS LIST 10 yoke
11 tooth
12 slot
13 armature winding
14 opening
15 rotor
100 stator
110 yoke part
111 recess
120 tooth part
121 segment
121A tooth
121B slot
121C opening
122 seam
123 magnetic field
130 armature winding
200 oriented electromagnetic steel sheet
201 arrow
300 rotor
310 rotor core
320 permanent magnet
400 air gap

The invention claimed is:

1. A motor stator, comprising:
a circular yoke part having a plurality of recesses at an inner circumference and stacked in an axial direction of a motor,
a tooth part in which segment parts radially having a plurality of teeth contained at one end in the plurality of recesses and connected arcuately at the other end are joined circularly at a joint portion, and stacked in the axial direction of the motor, wherein the joint portion is at an end of each of the segment parts and at an inner circumferential surface of the tooth part, and armature windings wound from one end of the teeth, wherein each tooth of the plurality of teeth has an end portion provided into a corresponding one of the plurality of recesses at the inner cumference of the circular yoke part.

2. The motor stator according to claim 1, wherein the circularly connected segments are disposed being displaced and stacked such that seams formed in the axially adjacent circular segments are not aligned, wherein the joint portion includes one of the seams.

3. The motor stator according to claim 2, wherein the seams are distributed evenly with no localization over the segments when projected in the axial direction of the motor.

4. The motor stator according to claim 1 wherein the inner circumferential surface of the tooth part is joined circularly and a portion between each of the teeth is closed.

5. The motor stator according to claim 1, wherein the segment part comprises an oriented electromagnetic steel sheet in which the magnetic flux easy permeable rolling direction is directed to the longitudinal direction of the tooth part.

6. The motor stator according to claim 1, wherein the yoke part comprises a non-oriented electromagnetic steel sheet having magnetic properties excellent in average to all of directions.

7. A method of manufacturing a motor stator, comprising:

a step of punching a segment part radially having a plurality of teeth and arcuately connected at one end from an oriented electromagnetic steel sheet, a step of circularly connecting the segment parts at a joint portion, wherein the joint portion is at an end of each of the segment parts and at an inner circumferential surface of the tooth part, a step of stacking the circularly- connected segment parts thereby forming a tooth part, a step of winding an armature winding from the other end of the tooth, and a step of fitting the tooth part into a circular yoke part having a plurality of recesses at the inner circumference and stacked in an axial direction of the motor;

wherein each tooth of the plurality of teeth has an end portion provided into a corresponding one of the plurality of recesses at the inner circumference of the circular yoke part.

8. A motor, comprising:

a rotor; and a stator in which teeth are wound with armature windings, including:

a circular yoke part having a plurality of recesses at the inner circumference and stacked in an axial direction of the motor, a tooth part in which segment parts radially have a plurality of teeth contained at one end in the plurality of recesses and connected arcuately at the other end are joined circularly at a joint portion, and stacked in the axial direction of the motor, wherein the joint portion is at an end of each of the segment parts and at an inner circumferential surface of the tooth part, and an armature winding is wound from one end of the tooth, wherein each tooth of the plurality of teeth has an end portion provided into a corresponding one of the plurality of recesses at the inner circumference of the circular yoke part.

* * * * *